United States Patent [19]

Karlsson

[11] 4,068,857

[45] Jan. 17, 1978

[54] APPARATUS ENABLING DISABLED PERSONS TO MOVE INDEPENDENTLY

[76] Inventor: Sven Arne Lennart Karlsson, Box 4, S-570 81 Jarnforsen, Sweden

[21] Appl. No.: 573,081

[22] Filed: Apr. 30, 1975

[30] Foreign Application Priority Data

Apr. 30, 1974 Sweden ................................ 7405830

[51] Int. Cl.² ................................................ B62M 1/02

[52] U.S. Cl. ........................................ 280/259; 297/5; 272/70.4

[58] Field of Search ............ 280/259, 261, 282, 87.01, 280/87.02 R, 276, 87.04 R; 272/70.3, 70.4; 297/5; 74/594.6

[56] References Cited

U.S. PATENT DOCUMENTS

| | | | |
|---|---|---|---|
| 1,162,364 | 11/1915 | Jahnke | 280/259 |
| 1,417,447 | 5/1922 | Brown | 74/594.6 |
| 2,459,066 | 1/1949 | Duke | 297/5 |
| 2,539,577 | 1/1951 | Hack | 297/5 |
| 2,670,970 | 3/1954 | Simonson et al. | 280/259 |
| 3,366,193 | 1/1968 | Campbell | 280/276 X |
| 3,381,973 | 5/1968 | Carr | 280/242 WC |
| 3,488,088 | 1/1970 | Goldberg | 297/5 |
| 3,580,569 | 5/1971 | Wilson | 272/70.3 |
| 3,588,144 | 6/1971 | Padial | 280/276 |
| 3,829,127 | 8/1974 | McLellan | 280/259 |

FOREIGN PATENT DOCUMENTS

| | | | |
|---|---|---|---|
| 161,126 | 3/1904 | Germany | 280/87.04 R |
| 579,543 | 8/1946 | United Kingdom | 297/5 |
| 698,775 | 10/1956 | United Kingdom | 272/70.4 |

*Primary Examiner*—Joseph F. Peters, Jr.
*Assistant Examiner*—Donn M. McGiehan
*Attorney, Agent, or Firm*—Ulle C. Linton

[57] ABSTRACT

An apparatus with vertical frame with a pedal driven wheel inside said frame for supporting or being driven by legs of an invalid standing on said pedals or seated upon a seat at the upper interior part of the frame and a steering wheel extending forwardly of said frame and additional wheeled means supporting said frame on a substrate upright so that the person can move about or be pulled for being moved while exercising the person legs.

1 Claim, 3 Drawing Figures

APPARATUS ENABLING DISABLED PERSONS TO MOVE INDEPENDENTLY

The present invention relates to an apparatus enabling disabled persons to move independently, which persons have weak leg muscles or are more or less paralyzed in a major part of their bodies but may work with their legs.

Hitherto, training of patients with totally or partially ceased muscle strength in their legs due to fractures or other disorders, have been accomplished by means of so called bed cycles or walking chairs of different kinds. The training offered by these apparatuses has however, not always been completely satisfying, among other things due to lack of the required psychologic stimulus gained by freely moving among other patients or outdoors. These drawbacks and others resulting from the previously known apparatuses and methods for rehabilitation are effectively eliminated with the apparatus according to the present invention, having the characteristics disclosed in the following claims, and at the same time a very easily handled and economical apparatus is obtained.

In the following, the invention will be described with reference to the accompanying drawings showing an examplifying embodiment of the same.

Figure 1:
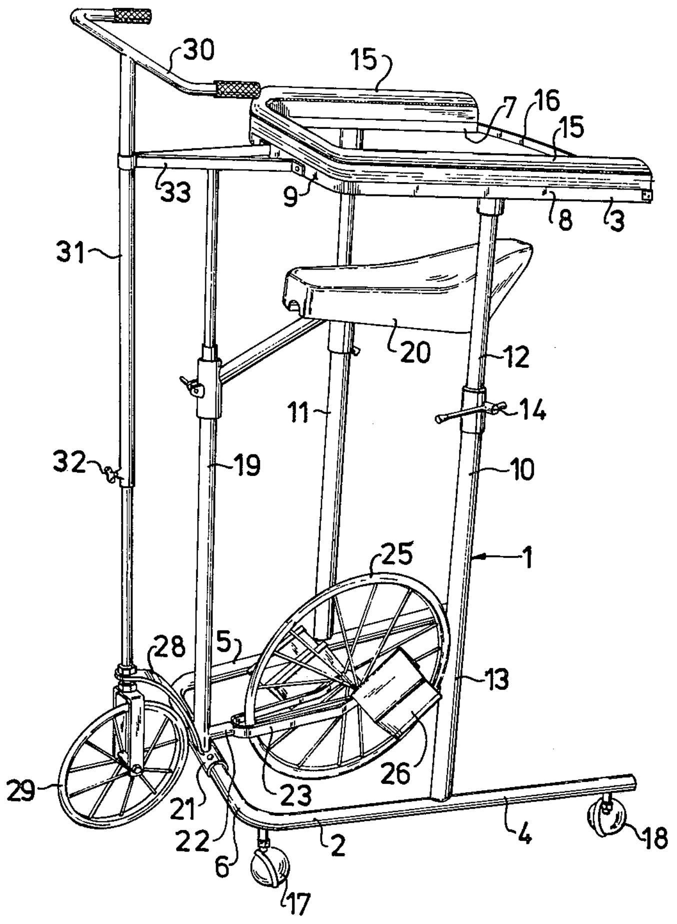
FIG. 1 shows a perspective view of the apparatus according to the present invention.

Reference numeral 1 designates the frame of the apparatus as a whole comprising a lower, preferably horizontal frame member 2 and an upper frame member 3 substantially parallel to the lower frame member 2. Preferably, the two frame members 2 and 3 are U-shaped and the lower frame member has two legs 4 and 5 and a waist portion 6 connecting said legs, while the upper frame member has legs 7 and 8 with the waist portion 9. The two frame members of U-shape are held at a distance to each other by means of vertically located posts 10, 11, which preferably are located at the central part of the legs of the frame members 2 and 3. To adjust the height level of the upper frame member 3 relative to the lower frame member, said posts 10 and 11 are telescopically provided with a tube 12 having a smaller diameter insertable into a tube 13 having a larger diameter, whereby a locking screw 14 or a similar means is provided to mutually lock the tubes 12 and 13. Suitably, the upper frame member 3 is provided with a stuffing 15 and has a fastening belt 16 at the rear open portion thereof, which belt is adjustably provided with a clip (not shown) or the like. The lower frame member is supported by a number of wheels 17, 18 and the number and position of the wheels may thereby vary; but according to a preferred embodiment the wheels are located by the corner portions of the limiting surface of the frame member 2 and thus, four wheels are provided, and suitably, these may be located centrally along the legs 4 and 5, i.e. in the vicinity of the attachment points of the posts 10, 11 to the legs 4, 5. The wheels may be of any suitable type but for indoor use so called casters are most suitable since these do very easily swing about their own vertical axis.

Figure 2:
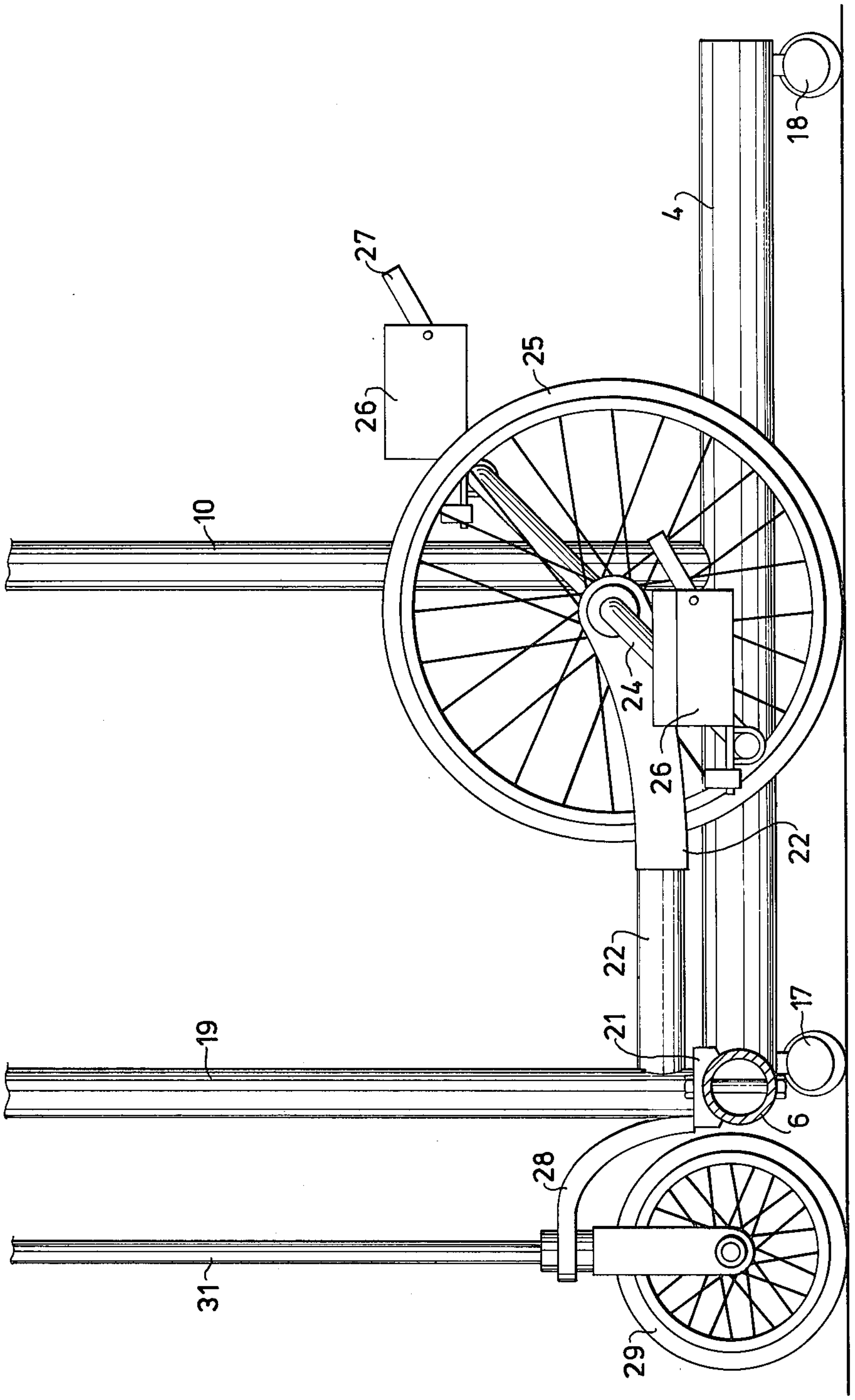
FIG. 2 is a detail view of the lower portion of said apparatus seen on a larger scale.

A vertical saddle post 19 is attached to the waist portion 6 of the lower frame member 2, preferably in the central portion thereof, and said saddle post supports a saddle 20, mounted thereon in a vertically movable manner. A short tube 22 projects rearwardly from the attachment portion 21 (FIG. 2) by the waist portion 6, and a fork 23 is attached to the tube in which fork a driving wheel 25 provided with pedals 24 is rotationally journalled. In order to satisfactorily hold the feet of the patient using the apparatus according to the invention, the pedals are provided with a hood 26, having at least one strap 27 by means of which the foot of the patient may be clamped in the pedal. An attachment device 28 projects forwardly from the portion 21 for a wheel 29 journalled to swing about a vertical axis. The attachment device 22, 23 for the two wheels 25 and 29 is suitably so dimensionated that a certain resiliency is obtained, whereby a suitable contact pressure between the two wheels and the substrate is achieved, even in case the substrate is not completely flat. The pivotable wheel 29 is acted upon by a vertical shaft 31 operated by a handled steering bar 30, which shaft in a manner similar to the posts 10 and 11 is telescopically adjustable and may be locked in position by means of a screw 32. To stay the vertical shaft 31 a stay 33 is suitably provided between the shaft 31 and the upper frame member 3. To provide an easy walk and firstly, to obtain that the apparatus may be easily pivoted sideways, the driving wheel 25 may be placed in such a manner that it is located in the center of the limiting surface defined by the wheels 17, 18, in case four wheels are used, i.e. the contact point of the wheel 25 with the substrate must be located in the intersection of the through diagonals drawn pair-wise between a front and the rear of the wheels 17, 18 located on the opposite leg. A breaking means, not further shown, may be included in the apparatus in connection to the driving wheel 25 or the pivotable wheel 29.

Figure 3:
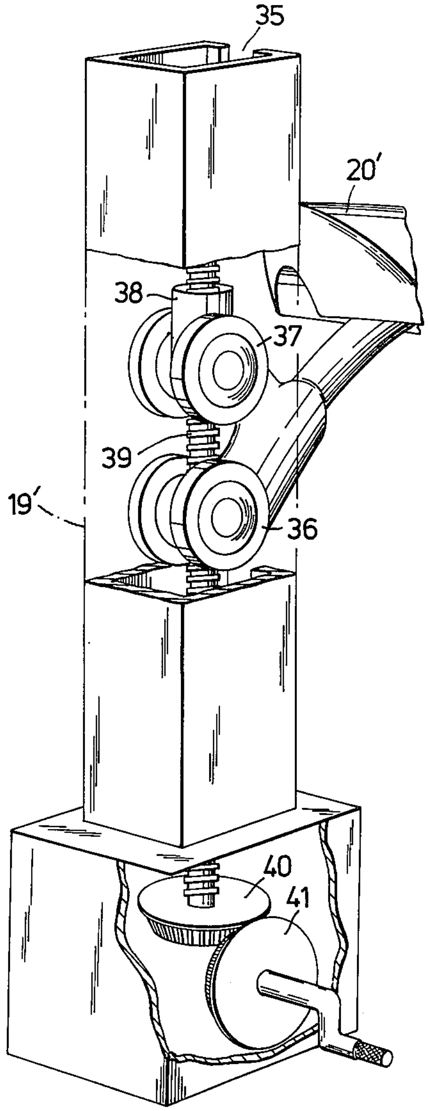
FIG. 3 is a detail view of the saddle post of the apparatus according to an embodiment other than illustrated in FIGS. 1 and 2.

FIG. 3 shows a modification of the attachment of the saddle 20 to the saddle post 19. Thereby, preferably the saddle post 19' comprises a square tube or the like provided with a forwardly directed slot 35 parallel to the longitudinal direction of the tube. Several rollers 36, 37 are provided on the saddle for slidable attachment to the saddle post, and said rollers slide within the saddle post 19', whereby said saddle may be easily vertically adjusted. A threaded nut 38 is centrally located between the wheels, and said nut is connected to a threaded shaft 39 in such a manner that when the shaft 39 is turned about the geometrical axis thereof, the saddle 20' may be raised or lowered with a slight force, while being loaded. The turning of the threaded shaft 39 is suitably accomplished by means of an angle gear 40, 41 of some suitable type, such as conical gear-wheels, a worm gear or the like. In case conical gear-wheels are utilized, the free gear-wheel may be provided with a crank means or the like.

In utilizing the apparatus according to the invention a patient completely lacking moving ability in his legs may be fastened in the apparatus and thereafter, said apparatus may be pulled by a nurse or another suitable person, whereby the legs of the patient follows the movement of the pedals 24 and in this manner the circulation of the blood in his legs is stimulated, and also the muscle built up at the same time as generation of articular cartilage is prevented. As soon as the patient has obtained the slightest muscle strength in his legs he may himself propulse the apparatus due to the very light structure thereof and the low rolling resistance, and since the patient may exercise among other patients and attendants in for an example a hospital corridor, he is stimulated to further training since psychologically it means a lot that he may move among people instead of staying, for example, alone in his bed and exercise by means of a bed cycle. It is obvious that the apparatus according to the invention includes several similar fields of application and said apparatus is very easy to transport.

Naturally, the invention is not limited to the description given above and the illustrations in the drawing, but may be varied in several ways within the scope of the following claims without departing from the spirit of the invention.

As examples of variations, it may be mentioned that the steering bar 30 may be replaced by some device that makes is possible for the patient to steer by means of his chin, for example, and the location of the posts 10, 11 may be varied such as forwardly displaced, and it is also possible to connect an electric engine to the driving wheel for automatic propulsion.

I claim:

1. An apparatus for the independent movement and exercise of disabled persons comprising a wheel supported frame including a lower horizontal frame member, an upper frame member substantially parallel to, but spaced from said lower frame member, vertically extending posts connecting said frame members, a wheel being pivotally connected to and extending forwardly of said lower frame member, a steering bar being operatively connected to said wheel, a driving wheel provided with pedals, being rotatably connected to and extending within said lower frame member, said lower frame member and said upper frame member each being U-shaped having two legs diverging from a waist portion connecting said legs, a vertical saddle post extending from the central waist portion of said lower frame member and a saddle adjustably mounted on said saddle post.

* * * * *